No. 870,941. PATENTED NOV. 12, 1907.
A. B. DAY.
AXLE LUBRICATOR.
APPLICATION FILED JUNE 13, 1907.
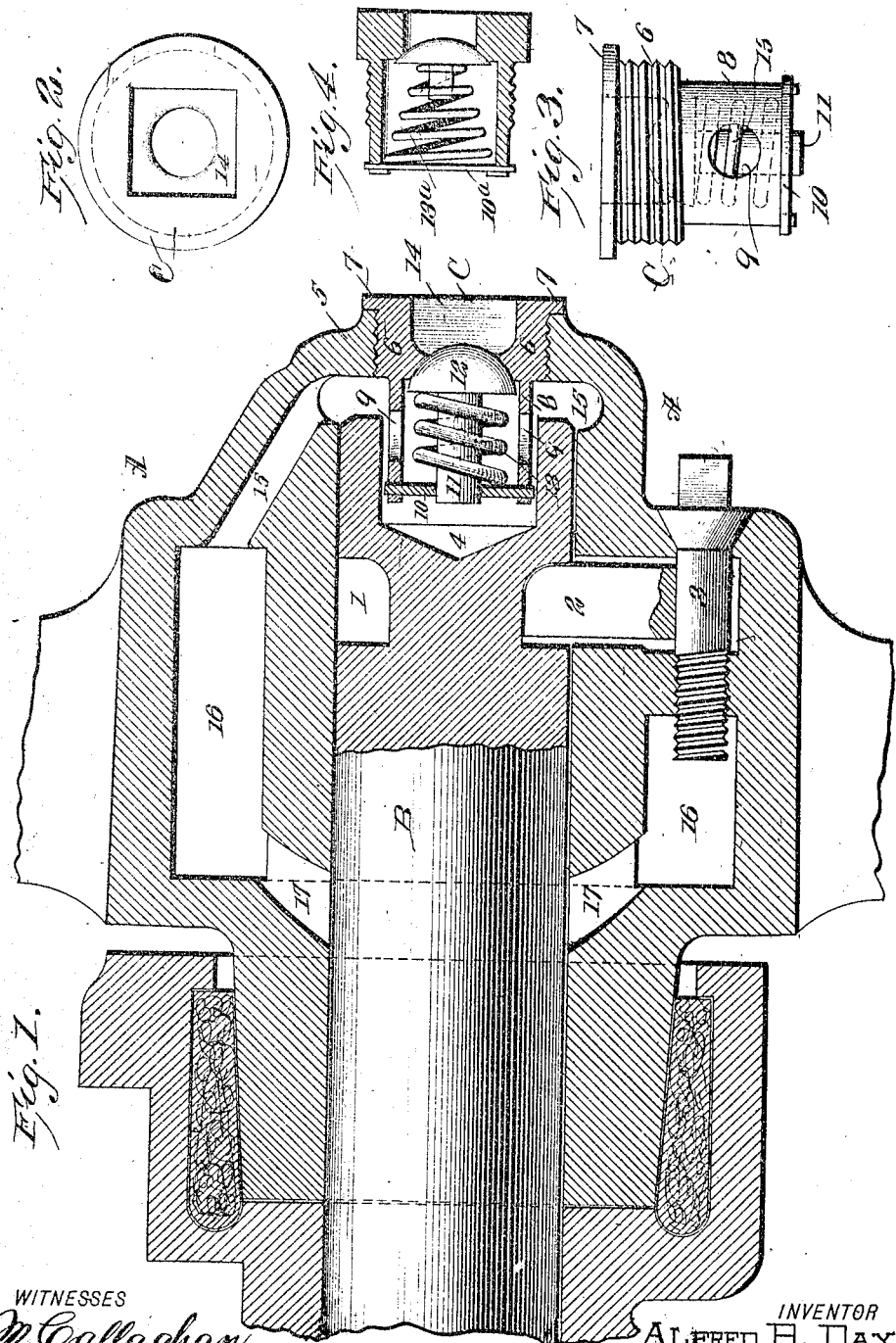
WITNESSES
E. M. Callaghan
Amos W. Hart
INVENTOR
ALFRED B. DAY
BY Munn & Co.
ATTORNEYS.

UNITED STATES PATENT OFFICE.

ALFRED B. DAY, OF KNOXVILLE, TENNESSEE.

AXLE-LUBRICATOR.

No. 870,941.  Specification of Letters Patent.  Patented Nov. 12, 1907.

Application filed June 13, 1907. Serial No. 378,791.

*To all whom it may concern:*

Be it known that I, ALFRED B. DAY, a citizen of the United States, and a resident of Knoxville, in the county of Knox and State of Tennessee, have invented an Improved Axle-Lubricator.

My invention relates to that class of axle lubricators in which the outer end of the hub is provided with an opening for reception of lubricant, the same being normally closed by a spring valve.
My invention is more particularly an improvement upon the lubricator forming the subject of a patent granted to H. W. Sanford, No. 847,263, dated Mar. 12, 1907.

The details of construction, arrangement, and combination of parts, and the advantages derived therefrom, are hereinafter set forth.

In the accompanying drawing Figure 1 is mainly a central longitudinal section of the hub portion of a car-wheel, and my improved lubricating attachment applied thereto in connection with the chambered end of the axle. Fig. 2 is an end view of the cage, or holder, for the spring valve. Fig. 3 is a plan view of the same. Fig. 4 is a central section of a modified form of cage.

A indicates the hub of the wheel, and B the chambered axle upon which it is adapted to rotate in the usual way. It will be understood that as a rule the axle will be secured non-rotatably in the car truck. An annular groove 1 is formed in the axle near its end to receive a key-block 2, which is held in place by a screw-bolt or plug 3. As shown, the end of the axle B is provided with a large chamber 4. In place of the outer end 5 of the hub being provided with a small opening merely sufficient to receive the nozzle of an oil-can, as in the patent aforesaid, the hub is provided with a large opening whose edge is screw-threaded to receive the cage or cage-holder C. As will be seen from the several figures of the drawing, this cage comprises a screw-threaded portion or body 6, which is adapted to screw and fit into the enlarged bore of the hub. The outer end of said body is provided with a radial flange 7, which, when the cage C is screwed into place, abuts the adjacent portion of the hub. The inner portion 8 of the cage C is a smooth cylinder of less diameter than the threaded body 6, and provided with lateral openings 9 for the passage of lubricant. The inner end of the cage is closed by a disk 10, which is provided with a central opening to receive the cylindrical stem 11 of a conical valve 12. Said disk 10 therefore constitutes a guide for the valve stem. The periphery of the valve proper is extended laterally, or is of such width that it approaches closely the inner side of the body 8, so that when the valve is pressed back by the introduction of the nozzle of an oil-can it is guided practically in a straight direction. A spiral spring 13 surrounds the stem 11, being thus interposed between the hub or valve proper and the disk 10. Thus the valve is held normally seated closely in the body, or threaded portion 6, of the cage. Such body is provided exteriorly with a recess 14, which, as shown in Fig. 2, is made rectangular for the purpose of receiving a tool or wrench for screwing the cage in or out of the hub, or the end of the plug may have a nick to receive a screw-driver.

It is apparent that when the valve 12 is pressed back from its seat by the nozzle of an oil-can, oil may be introduced into the hollow body 8 of the cage, and will flow thence through the openings 9 into the lateral oil passages or ducts 15 that lead to the large oil chambers 16 in the body of the hub, and from thence ducts 17 lead at the rear to the bearing of the axle B, or to a point inside the locking groove.

It will be seen that by my improved construction and arrangement of parts, I provide a lubricating attachment containing a normally seated valve, but adapted to be opened by due pressure, the body or cage of the same being adapted to be screwed into the wheel hub, and a portion of the attachment projecting into the recess in the end of the axle. Thus the length of the bearing of the axle is not reduced, nor is the same weakened at the end so as to impair its usefulness, and I avoid the friction incident to axle-lubricating attachments in which a spring valve is seated directly against the hub end, by providing an attachment of this character. When removed, it allows quite free access to the lubricating chambers or recesses in the hub so that they may be cleaned more conveniently than would be otherwise practicable. In the construction such as illustrated in the patent aforesaid, the wheel has to be removed from the axle before the spring and valve can be taken out for repair. The body of the cage does not project from the hub far enough to be liable to injury by contact with other objects. The side openings in the cage proper allow oil to pass readily to the bearing, and the exterior recess 14 serves not only for the purpose before stated but also to receive an oil-can nozzle and guide the same to the opening normally closed by the valve.

In Fig. 4, the valve has a short stem, and a special spring 13$^a$ is shown seated on the disk and its small end encircling the valve stem. By this combination and arrangement of parts, it is unnecessary to provide a supplemental guide and support for the valve stem.

I claim—

1. The combination, with an axle having a recess formed in its end and a wheel hub provided with chambers for holding lubricant and with a screwthreaded opening in its outer end, of a valve attachment, comprising a spring-seated valve and a cage or holder therefor which is provided with a screwthreaded head adapted for insertion in the opening in the hub, the inner portion of the cage projecting inside the hub of the wheel and provided with lateral openings for the passage of lubricant, as described.

2. The combination, with an axle having a large recess in its end and a wheel hub having lubricant passages and chambers and provided at its outer end with an enlarged opening coincident with the recess in the axle, of a valve attachment, comprising a cage adapted for insertion in said opening and with a radial flange adapted to abut the portion of the hub surrounding the opening, said cage projecting, when in place, into the recess in the axle, and a spring-pressed valve seated outwardly in such cage, as shown and described.

ALFRED B. DAY.

Witnesses:
F. E. LAUGHEAD,
J. A. AHLER.